US000001046H

United States Statutory Invention Registration [19]

[11] Reg. Number: H1046

Tinney et al.

[43] Published: May 5, 1992

[54] DRILL CHUCK REMOVER

[75] Inventors: Ronnie C. Tinney, Noble; Gordon R. Stout, Choctaw, both of Okla.

[73] Assignee: The United States of America as represented by the Secretary of the Air Force, Washington, D.C.

[21] Appl. No.: 309,583

[22] Filed: Feb. 10, 1989

[51] Int. Cl.[5] ..... B25B 13/04
[52] U.S. Cl. ..... 81/120; 81/121.1
[58] Field of Search ..... 81/120, 121.1, 125, 81/176.1, 176.15, 176.2, 176.3, 124.3, 124.7, 177.5

[56] References Cited

U.S. PATENT DOCUMENTS

| | | | |
|---|---|---|---|
| 2,107,834 | 2/1938 | Phillips | 81/177.5 X |
| 2,279,118 | 4/1942 | Fortune et al. . | |
| 2,991,676 | 7/1961 | Bond | 81/176.3 |
| 3,094,022 | 6/1963 | Young | 81/176.1 X |
| 3,158,050 | 11/1964 | Shandel . | |
| 3,259,000 | 7/1966 | Lasch, Sr. | 81/176.15 |
| 3,855,882 | 12/1974 | Wittmann | 81/124.7 |
| 4,063,472 | 12/1977 | MacIntyre et al. | 81/125 X |
| 4,185,372 | 1/1980 | Dupree et al. . | |

FOREIGN PATENT DOCUMENTS

| | | | |
|---|---|---|---|
| 2200065 | 7/1988 | United Kingdom | 81/121.1 |

*Primary Examiner*—Michael J. Carone
*Attorney, Agent, or Firm*—Bobby D. Scearce; Donald J. Singer

[57] ABSTRACT

A tool for removing a drill chuck from the threaded shaft of a drill motor is described which comprises a tubular segment sized for snugly receiving the drill chuck and including a threaded hole defined through the wall thereof for receiving a set screw for engaging the drill chuck for securing the tubular segment thereto, and a pair of lugs, a rod or other gripping surface welded to or defined on the outer surface of the tubular segment on which the segment may be impacted in a rotary direction for threadably removing the chuck from the drill motor shaft.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRILL CHUCK REMOVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to small hand tools, and more particularly to a tool for removing a worn or damaged chuck from a drill having a threaded shaft supporting the chuck.

Existing methods for removing a chuck from the threaded shaft of a drill to which the chuck is attached comprise generally crude hand methods presenting real risk of injury to the worker performing the task. For example, a typical procedure may include the steps of driving a punch or similar tool into one of the key holes of the chuck, securing the drill by its handle in a vise, and striking the punch with a sufficient number of sharp blows with a hammer or the like to break the chuck loose from the threaded shaft of the drill. This procedure presents a real hazard that the punch may, under the impact of repeated blows, be propelled about the workplace resulting in personal injury or property damage. Repeated strikes may also result in bending the drill motor shaft or in other damage to the drill.

The invention solves or substantially reduces in critical importance problems in the prior art as just suggested by providing a tool for attachment to the chuck of a drill for safely removing the chuck from the threaded shaft of the drill for replacement or repair. The tool comprises a tubular member with a set screw for attachment to the chuck of the drill, and a pair of lugs or a rod or the like welded or otherwise attached to the tubular member providing means for tapping the tool for breaking the chuck loose from the threaded shaft of the drill.

It is therefore a principal object of the invention to provide a tool for removing a chuck from a threaded shaft of a drill.

It is a further object of the invention to provide a tool for safely removing a threaded chuck from a drill without risking injury to the worker or causing damage to the drill.

These and other objects of the invention will become apparent as the detailed description of representative embodiments proceeds.

SUMMARY OF THE INVENTION

In accordance with the foregoing principles and objects of the invention, a tool for removing a drill chuck from the threaded shaft of a drill motor is described which comprises a tubular segment sized for snugly receiving the drill chuck and including a threaded hole defined through the wall thereof for receiving a set screw for engaging the drill chuck for securing the tubular segment thereto, and a pair of lugs, a rod or other gripping surface welded to or defined on the outer surface of the tubular segment on which the segment may be impacted in a rotary direction for threadably removing the chuck from the drill motor shaft.

DESCRIPTION OF THE DRAWINGS

The invention will be clearly understood from the following detailed description of representative embodiments thereof read in conjunction with the accompanying drawing wherein.

DETAILED DESCRIPTION

Figure 1:
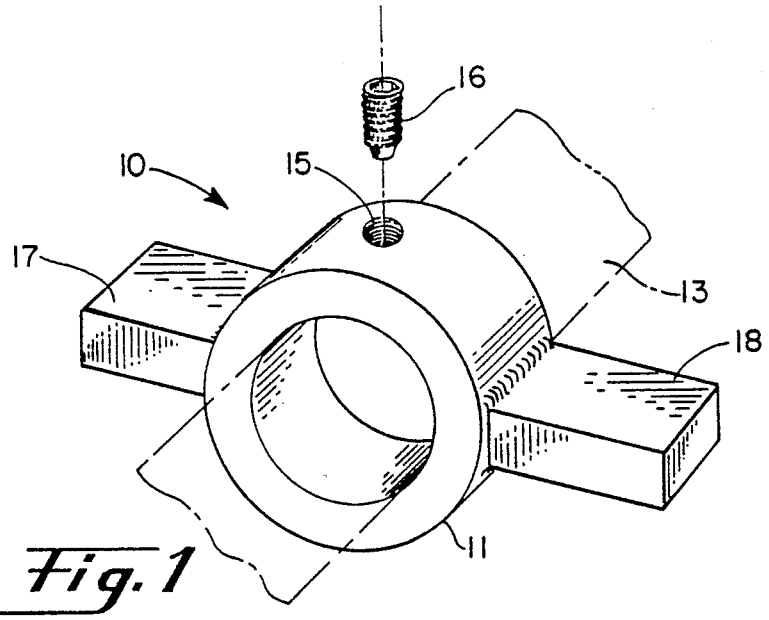
FIGS 1–3 show perspective views of three separate embodiments of the invention.
Figure 2:
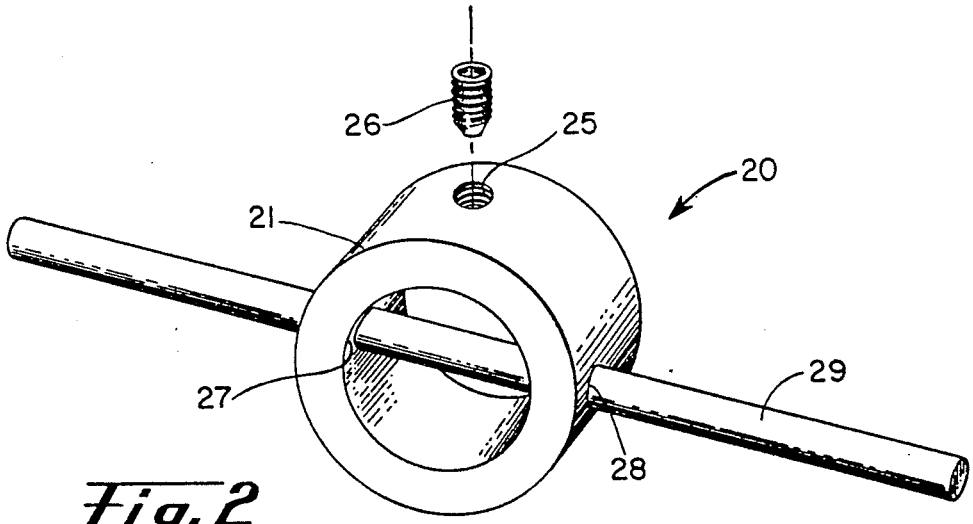
Figure 3:
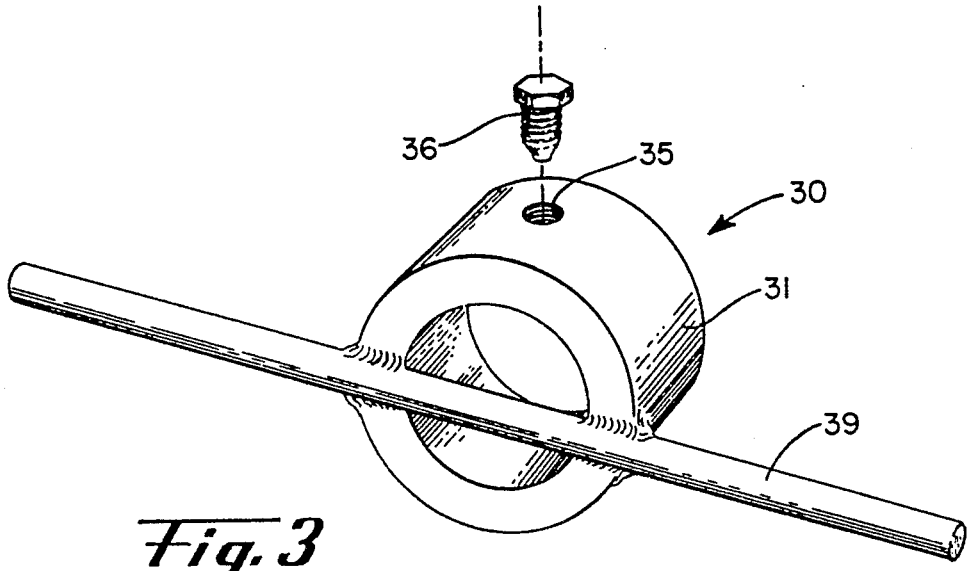

Referring now to the drawings, FIGS. 1–3 show views in perspective of three separate embodiments of the invention. In FIG. 1 is illustrated drill chuck remover 10 including a tubular segment 11 sized on the internal diameter thereof for receiving a drill chuck 13 (shown in phantom). It is understood that the invention may be configured and sized for removal of a chuck from any type of power drill (electrically, pneumatically, or otherwise powered) having a threaded shaft, two such representative power drill types being discussed below in relation to FIGS. 4 and 5. Chuck diameters for which corresponding forms of the invention may be applicable may typically range from about 7/8 inch to $1\frac{3}{4}$ inches. A tapped hole 15 is provided in segment 11 for receiving set screw 16 (securable with allen wrench, screw driver or the like) for engaging drill chuck 13 in the use of chuck remover 10 as hereinafter more fully described. A pair of lugs 17,18 are welded to segment 11 at diametrically opposite locations as suggested in FIG 1. Lugs 17,18 provide gripping means for chuck remover 10, or appendages for impacting chuck remover 10 in a rotary sense (using a hammer or the like) for breaking drill chuck 13 free from the shaft of the drill motor to which the chuck is threadably attached.

Referring now to FIG. 2, shown therein is another form of the invention wherein drill chuck remover 20 includes tubular segment 21 having tapped hole 25 for receiving set screw 26 all sized for the same functions as similarly named elements of the FIG. 1 embodiment. Tubular segment 21 further includes a pair of diametrically aligned holes 27,28 through the wall thereof for slideably receiving rod 29 serving the same function as welded lugs 17,18 of the FIG. 1 embodiment for use in breaking a chuck free from the drill motor shaft to which the chuck is threadably attached.

Referring now to FIG. 3, shown therein is another drill chuck remover 30 of the invention including tubular segment 31 with tapped hole 35 and an alternate form of set screw 36. In the FIG. 3 embodiment, tubular segment 31 has rod 39 welded at one end thereof for serving the same function as welded lugs 17,18 of FIG. 1 and rod 29 of FIG. 2.

Figure 4:
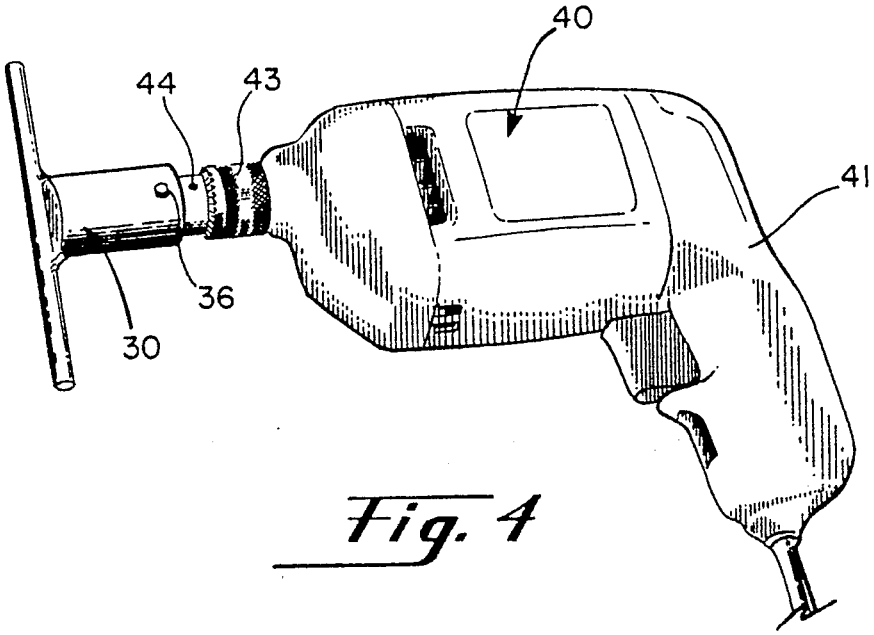
FIG. 4 is a perspective view of an embodiment of the invention applied to the chuck of a hand power drill.
Figure 5:
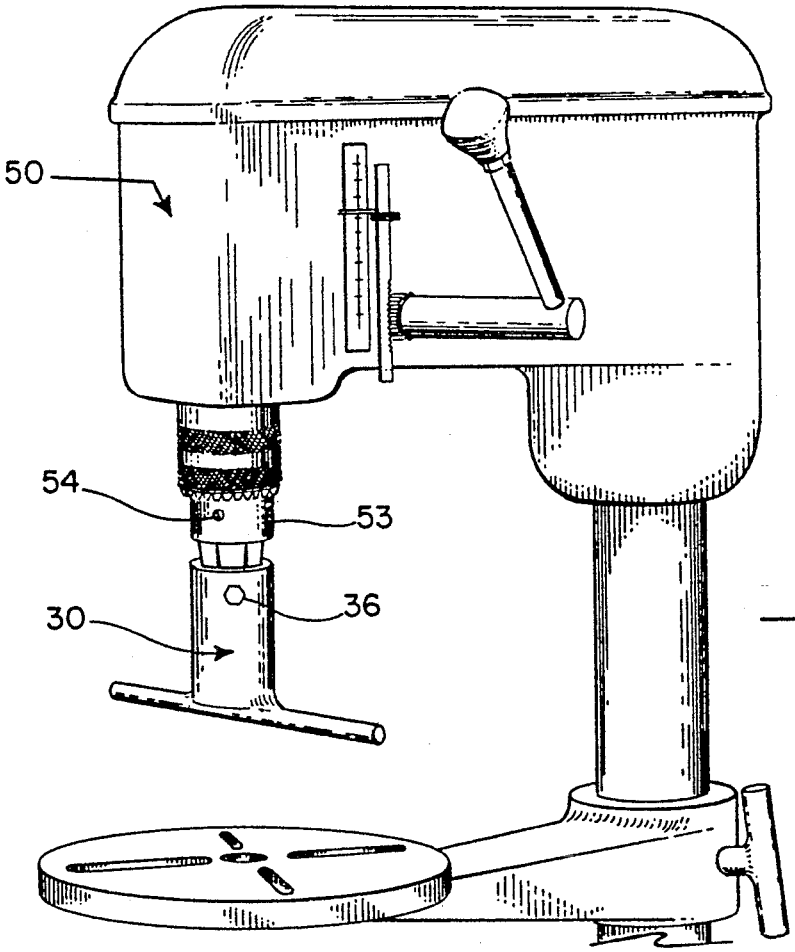
FIG. 5 is a perspective view of an embodiment of the invention applied to the chuck of a drill press.

Referring now to FIGS. 4 and 5 collectively, shown therein are perspective views of one representative embodiment (30) of the invention applied, respectively, to chucks of a hand power drill 40 and a drill press 50 having threaded shafts for receiving the respective chucks. As shown in FIGS. 4 and 5, drill chuck remover 30 fits as snugly as practical over drill chucks 43,53. Set screw 36 is threaded into threaded hole 35 substantially through the wall of tubular segment 31 and may engage one of the existing key holes 44 or 54 of chucks 43 or 53 and is tightened using a tool corresponding to the type of set screw. For hand power drill 40, drill case 41 is secured in a vise or otherwise firmly held and the lugs or rod are struck sharply with a hammer or the like to break chuck 43 loose from the shaft of drill 40. For removing chuck 53 from drill press 50, the chuck remover need only be attached to the chuck 53 as described above for drill 40 and struck sharply to remove chuck 53. With the chuck remover of the invention secured to the chuck, the remover cannot be accidentally propelled about the workplace under the impact of repeated blows with possible resultant personal injury or property damage; also, little danger exists for inadvertently bending the shaft of the drill motor or otherwise damaging the drill.

The invention therefore provides a tool for attachment to the chuck of a drill for safely removing the chuck from the threaded shaft of the drill. It is understood that modifications to the invention as described may be made by one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A tool for removing a drill chuck from the threaded shaft of a motor of a drill supporting said chuck, said chuck including a key hole therein, said tool comprising:

(a) a tubular segment sized for snugly receiving said drill chuck of said drill;

(b) a threaded hole defined through the wall of said tubular segment;

(c) a set screw received by said threaded hole and sized for engaging the key hole of said drill chuck and thereby securing said tubular segment to said drill chuck;

(d) means defined on the outer surface of said tubular segment for impacting said segment in a rotary direction for threadably removing said chuck from said threaded shaft.

2. The tool of claim 1 wherein said means defined on the outer surface of said tubular segment comprises a pair of lugs welded on the outer surface of said tubular segment at diametrically opposite locations thereon.

3. The tool of claim 1 wherein said means defined on the outer surface of said tubular segment comprises a rod welded to one end of said tubular segment.

4. The tool of claim 1 further comprising a pair of diametrically opposed holes in the wall of said tubular segment and wherein said means defined on the outer surface of said tubular segment comprises a rod slideably received by said holes in said tubular segment.

* * * * *